United States Patent
Park et al.

(10) Patent No.: US 6,593,688 B2
(45) Date of Patent: Jul. 15, 2003

(54) ELECTROLUMINESCENT DEVICES EMPLOYING ORGANIC LUMINESCENT MATERIAL/CLAY NANOCOMPOSITES

(75) Inventors: O-Ok Park, Taejon (KR); Tae-Woo Lee, Taejon (KR)

(73) Assignee: Korea Advanced Institute of Science and Technology (KR)

(*) Notice: Subject to any disclaimer, the term of this patent is extended or adjusted under 35 U.S.C. 154(b) by 0 days.

(21) Appl. No.: 09/995,950

(22) Filed: Nov. 27, 2001

(65) Prior Publication Data

US 2002/0041151 A1 Apr. 11, 2002

Related U.S. Application Data

(63) Continuation of application No. PCT/KR01/00534, filed on Mar. 30, 2001.

(30) Foreign Application Priority Data

Mar. 30, 2000 (KR) .................................. 2000-16466

(51) Int. Cl.[7] .............................................. H05B 33/20
(52) U.S. Cl. ........................ 313/504; 313/506; 428/917
(58) Field of Search ............................ 313/503, 504, 313/506, 509

(56) References Cited

U.S. PATENT DOCUMENTS

| | | | |
|---|---|---|---|
| 4,145,480 A | * 3/1979 | Kusama et al. | 428/513 |
| 5,326,692 A | * 7/1994 | Brinkley et al. | 435/6 |
| 5,593,788 A | * 1/1997 | Shi et al. | 428/690 |
| 5,653,914 A | 8/1997 | Holmes et al. | 252/301.16 |
| 5,705,888 A | * 1/1998 | Staring et al. | 313/503 |
| 5,719,467 A | 2/1998 | Antoniadis et al. | 313/506 |
| 6,146,809 A | * 11/2000 | Devlin et al. | 430/270.1 |
| 6,274,065 B1 | * 8/2001 | Deno et al. | 252/301.16 |

FOREIGN PATENT DOCUMENTS

| | | | |
|---|---|---|---|
| JP | 03-190991 | 8/1991 | C09K/11/08 |
| WO | WO 01/72925 A1 | 10/2001 | C09K/11/00 |

OTHER PUBLICATIONS

Lawrence & West, Ceramic Science for the Potter, 1982 (no month), second edition, pp 18–23.*
W. Lawrence, et al., Ceramic Science for the Potter, pp 4, 5, 13, 19, 49–53.*
Thomas J. Pinnavaia et al., *Polymer–Clay Nanocomposites*, 129–131 (John Wiley & Sons 2001).
Jong Hyeok Park et al., *New Approach to Enhance the Yield Stress of Electro–Rheological Fluids by Polyaniline–Coated Layered Silicate Nanocomposites*, 22 Micromol. Rapid. Commun. 616–619 (2001).

(List continued on next page.)

*Primary Examiner*—Michael H. Day
(74) *Attorney, Agent, or Firm*—Knobbe Martens Olson & Bear LLP

(57) ABSTRACT

The present invention relates to an organic luminescent material/clay nanocomposite with improved luminescent efficiency and stability, which is prepared by blending an organic luminescent material with a nanoclay, and an electroluminescent device employing the same. The electroluminescent device of the invention comprises: a transparent substrate; a semitransparent electrode deposited on the transparent substrate; a clay nanocomposite emissive layer spin-coated with an organic EL material/clay nanocomposite, positioned on the semitransparent electrode; and, a metal electrode deposited on the clay nanocomposite emissive layer. Since the electroluminescent device of the invention provides improved luminescent efficiency and stability, it can be practically applied to the development of organic semi-conductor.

25 Claims, 4 Drawing Sheets

OTHER PUBLICATIONS

Carter, et al., *Enhanced Luminance in Polymer Composite Light Emitting Devices*, Appl. Phys. Lett., 71(9):1145–1147(1997), Sep.

Bozano, et al., *Temperature–Dependent Recombination in Polymer composite Light–Emitting Diodes*, Appl. Phys. Lett., 73(26):3911–3913(1998), Dec.

Mattoussi, et al., *Electroluminescence from Heterostructures of Poly(Phenylene vinylene) and Inorganic CdSe Nanocrystals*, J. Appl. Phys., 83(12):7965–7974 Jun. 1998.

Que, et al., *Photoluminescence and Electroluminescence from Copper Doped Zinc Sulphide Nanocrystals/Polymer Composite*, Appl. Phys. Lett., 73(19):2727–2729(1998), Nov.

* cited by examiner

US 6,593,688 B2

ELECTROLUMINESCENT DEVICES EMPLOYING ORGANIC LUMINESCENT MATERIAL/CLAY NANOCOMPOSITES

RELATED APPLICATION INFORMATION

This application is a continuation under 35 U.S.C. §365 (c) claiming the benefit of the filing date of PCT Application No. PCT/KR01/00534 designating the United States, filed Mar. 30, 2001 and published in English as WO 01/72925 A1 on Oct. 4, 2001, and which claims the benefit of the earlier filing date of Korean Patent Application No. 2000/16466, filed Mar. 30, 2000. The publication WO 01/72925 A1 is incorporated herein by reference.

BACKGROUND OF THE INVENTION

1. Field of the Invention

The present invention relates to electroluminescent devices employing an organic luminescent material/clay nanocomposite, more specifically, to an organic luminescent material/clay nanocomposite with improved luminescent efficiency and stability, which is prepared by blending an organic luminescent material and a nanoclay, and electroluminescent devices employing the same.

2. Description of the Related Art

The development of electroluminescent ("EL") devices that emit light by applying an electric field has been continued, and polymer EL devices employing organic polymer/inorganic material nanocomposites have been developed and practiced in the art. These polymer EL devices utilize semiconductive inorganic materials, such as ZnS and CdS, and insulating inorganic materials such as $SiO_2$ and $TiO_2$. W. Que teaches luminescent polymers employing the semiconductive inorganic material, ZnS, and H. Mattoussi also teaches luminescent polymers employing the semiconductive inorganic material, CdS (see: W. Que, Applied Physics Letter, 73:2727, 1998; H. Mattoussi, Journal of Applied Physics, 83:796, 1998). Besides, luminescent polymers employing an insulating inorganic material of $SiO_2$ have been reported by S. A. Carter, and luminescent polymers employing an insulating inorganic material of $TiO_2$ have been reported by L. Gozano (see: S. A. Carter, Applied Physics Letters, 71:1145, 1997; L. Gozano, Applied Physics Letters, 73:3911, 1998), in which the inorganic materials mixed with polymers have been used as luminescent layers. The inorganic nanomaterials are known to help charge transport. However, the luminescent efficiencies of these newly developed EL devices are not considerably improved compared to the luminescent efficiencies of the conventional devices, and the stability of the devices are low due to the unsolved problem of penetration of oxygen and water.

Therefore, there are strong reasons for developing and exploring a novel material that can solve the problems associated with the polymer EL devices described above.

SUMMARY OF THE INVENTION

The present inventors made an effort to provide a material that can improve the luminescent efficiency and stability of EL devices, and discovered that EL devices employing a luminescent material, an organic EL material/clay nanocomposite, prepared by blending an organic EL materials and a nanoclay, show the improved luminescent efficiency and stability.

A primary object of the present invention is, therefore, to provide an organic EL material/clay nanocomposite, prepared by blending an organic EL material and a nanoclay.

The other object of the present invention is to provide EL devices employing the organic EL material/clay nanocomposite.

Accordingly, a preferred embodiment provides a nanocomposite comprising an organic luminescent material and a laminated inorganic material, wherein the laminated inorganic material comprises layered plates and wherein the organic luminescent material is intercalated between the layered plates.

Another preferred embodiment provides an electroluminescent device which comprises: a transparent substrate; a semitransparent electrode deposited on the transparent substrate; an emissive layer comprising a nanocomposite, positioned on the semitransparent electrode; and a metal electrode deposited on the emissive layer.

Another preferred embodiment provides an electroluminescent device which comprises: a transparent substrate; a semitransparent electrode deposited on the transparent substrate; a hole transporting layer positioned on the semitransparent electrode; an emissive layer comprising a nanocomposite, positioned on the hole transporting layer; and a metal electrode deposited on the emissive layer.

Another preferred embodiment provides an electroluminescent device which comprises: a transparent substrate; a semitransparent electrode deposited on the transparent substrate; an emissive layer comprising a nanocomposite, positioned on the semitransparent electrode; an electron transporting layer positioned on the emissive layer; and a metal electrode deposited on the electron transporting layer.

Another preferred embodiment provides an electroluminescent device which comprises: a transparent substrate; a semitransparent electrode deposited on the transparent substrate; a hole transporting layer positioned on the semitransparent electrode, wherein the hole transporting layer comprises a material selected from the group consisting of poly(9-vinylcarbazole), 4,4'-dicarbazolyl-1,1'-biphenyl, (N,N'-diphenyl-N,N'-bis-(3-methylphenyl)-1,1'-biphenyl-4, 4'-diamine), (4,4'-bis[N-(-naphthyl-1-)-N-phenyl-amino]-biphenyl), triarylamine, pyrazole, and derivatives thereof; an emissive layer comprising the nanocomposite of claim 1, positioned on the hole transporting layer; an electron transporting layer positioned on the emissive layer, wherein the electron transporting layer comprises a material selected from the group consisting of 2,2',2'-(1,3,5-phenylene-tris[1-phenyl-1H-benzimidazole], poly(phenyl quinoxaline), 1,3, 5-tris-[(6,7,-dimethyl-3-phenyl)quinoxaline-2-yl]benzene, polyquinoline, tris(8-hydroxyquinoline)aluminum, and 6-N, N-diethylamino-1-methyl-3-phenyl-1H-pyrazolo[3,4-b] quinoline; and a metal electrode deposited on the electron transporting layer.

These and other embodiments are described in greater detail below.

BRIEF DESCRIPTION OF THE DRAWINGS

The above, the other objects and features of the invention will become apparent from the following descriptions given in conjunction with the accompanying drawings, in which.

Figure 1:
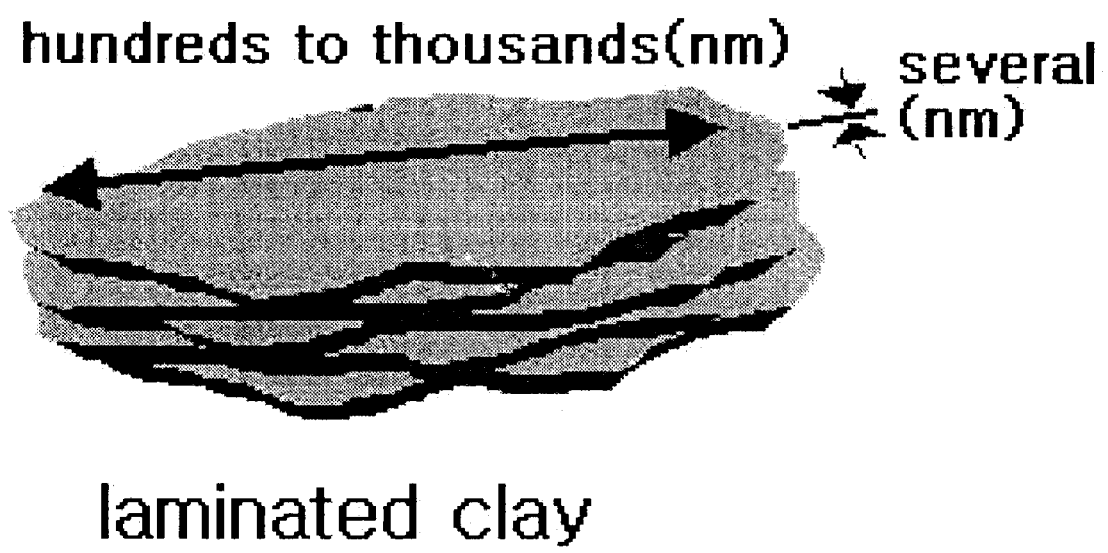
FIG. 1 is a schematic diagram depicting the structure of a nanoclay.

Explanation of major parts of the drawings:
1: transparent substrate
2: semitransparent electrode
3: hole transporting layer
4: clay nanocomposite emitting layer
5: electron transporting layer
6: metal electrode

DETAILED DESCRIPTION OF THE PREFERRED EMBODIMENT

Figure 3:
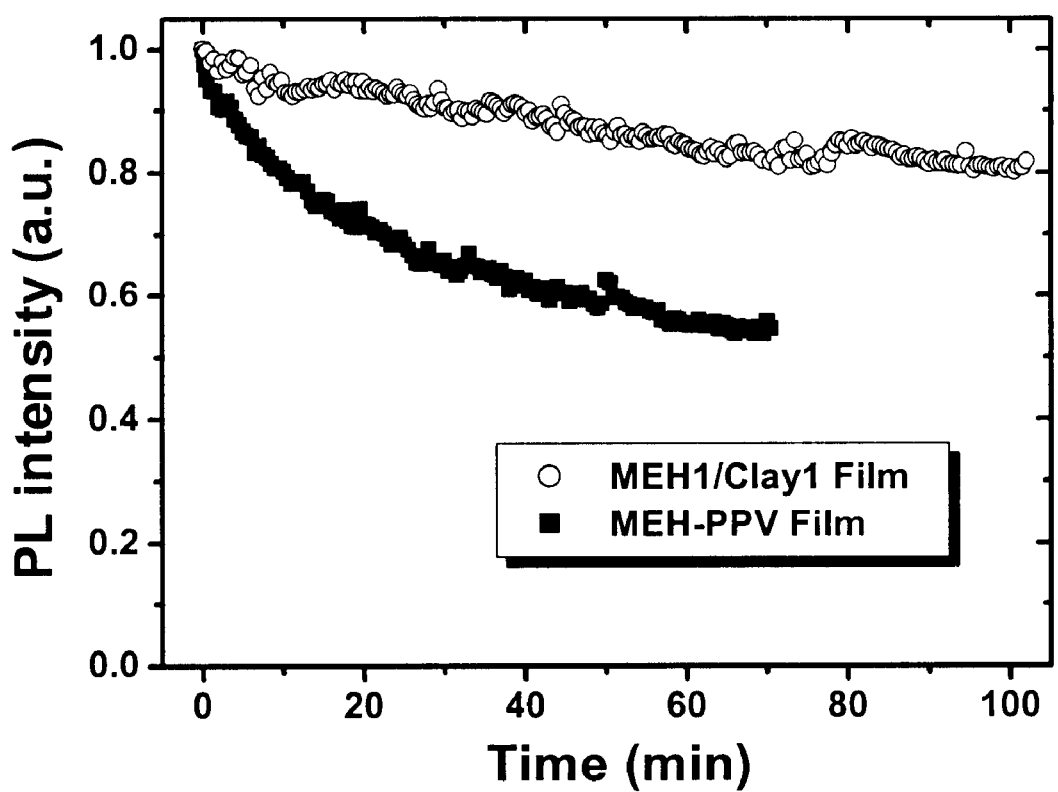
FIG. 3 is a graph showing the photoluminescence intensity versus time of an EL device of the present invention.

Organic EL material/clay nanocomposite of the present invention, in which an organic EL material and a nanoclay are blended, is prepared in a form of quantum well resulting from the intercalation of the organic EL material into the nanoclay. The nanoclay used is a laminated inorganic material with 0.2 to 2 nm thickness in the vertical direction and 10 to 5,000 nm width in the horizontal direction, and the organic EL material is intercalated between the layered plates (see: FIG. 1). The nanoclay includes materials having an insulating property, preferably montmorillonite (MMT), laponite and kaolinite. The 2-dimensional plate structure blocks electron or hole transport so that electric charges are collected between the plates, resulting in the improvement of the electron-hole recombination probability or the EL efficiency; and, it also considerably decreases the penetration of oxygen and moisture, which, in turn, improves the stability of the organic EL material/clay nanocomposite (see: FIG. 3).

The organic luminescent materials employed in the organic EL material/clay nanocomposite of the present invention can be used for many different types of organic luminescent materials including, but not limited to, emissive conjugated polymers, emissive non-conjugated polymers, copolymers of conjugated and nonconjugated segments, blends of the emissive polymer with emissive or non-emissive polymers, emissive small organic molecules such as monomers or oligomers, blends of the small organic molecules with emissive or non-emissive polymers, or blends of emissive small organic molecules and non-emissive small organic molecules.

Suitable choices for the emissive conjugated polymers include, but not limited to: poly(p-phenylene vinylene) and its derivatives such as MEH-PPV (poly[2-methoxy-5-(2'-ethylhexyloxy)-p-phenylene vinylene]), poly(pyridyl vinylene phenylene vinylene) (PPyVPV), and poly[1,4-(2,5-bis(1,4,7,10-tetraoxaundecyl))phenylene vinylene]; polythiophene and its derivatives such as poly[3-hexylthiophene-co-3-cyclohexylthiophene] and poly[3-(4-methoxypheyl)thiophene-2,5-diyl], poly(p-phenylene) and its derivatives such as dimethoxy-poly(p-phenylene), ladder poly(dihydrophenanthrene), and ladder poly(1,4-phenylene-2,5-thiophene); polyfluorene and its derivatives such as poly(9,9-dioctylfluorene), poly(2,7-bis(p-styryl)-9,9'-di-n-hexylfluorene sebacate); poly(arylene vinylene), where the arylene may be such moieties as naphthalene, anthracene, furylene, thienylene, oxadizole, and the like, or one of said moieties with functionalized substituents at various positions; derivatives of poly(arylene vinylene), where the arylene may be as in above, substituted at various positions on the arylene moieties; polyarylene and their derivatives substituted at various positions on the arylene moiety; polypyrrole and its derivatives; polyquinoline and its derivatives; polyacetylene and its derivatives; and, polyaniline and its derivatives, and the like.

The emissive non-conjugated polymers have non-conjugated main chains and side chains substituted with emissive functional groups such as anthracene.

Organic luminescent monomers or oligomers include metal chelate complexes of ligand structure such as luminescent alumina quinone (Alq3), and rubrene, anthracene, perylene, coumarin 6, Nile red, aromatic diamine, TPD (N,N'-diphenyl-n,n'-bis-(3-methylphenyl)-1,1'-biphenyl-4,4'-diamine), TAZ (3-(4-biphenyl)-4-phenyl-(4-tert-butylphenyl)1,2,4-triazole), and DCM (dicyanomethylene)-2-methyl-6-(p-dimethylaminostyryl)-4H-pyran), or derivatives thereof.

Non-emissive polymers, such as poly(m-methylacrylic acid), polystyrene, and poly(9-vinylcarbazole) can be used as a matrix for blends with emissive compounds; besides, blends of organic luminescent monomers or oligomers with the above emissive conjugated polymers or emissive non-conjugated polymers can be employed for the nanocomposite with a clay.

EL devices of the present invention employing organic EL material/clay nanocomposite include a substrate which is composed of a semitransparent electrode, a hole-transporting (or injecting) layer, an organic EL material/clay nanocomposite, an electron-transporting (or injecting) layer, and a metal electrode.

The EL devices of the invention have charge-injecting contact layers which serve as electrodes for applying the voltage across the thin layer. The devices of the invention have a semi-transparent conducting layer coated on a transparent substrate, which is utilized as a charge-injecting contact layer. The conducting layer includes metal oxides such as lead oxide, ITO (indium tin oxide), doped conducting polymers such as doped polyaniline, doped polypyrrole, PEDOT (polyethylene dioxyhiophene) or doped polythiophene and the like. The transparent substrates may be rigid or mechanically flexible, which include glass, quartz, plastics such as polyethylene terephthalate, and the like; and, the metal electrode includes aluminum, magnesium, lithium, calcium, copper, silver, iron, platinum, indium, palladium, tungsten, zinc, gold, lead and alloys thereof, which were also employed for an charge-injecting contact layer. Besides, graphite, inorganic semiconducting semiconductors such as silicon, germanium, gallium arsenide, silicon, and the like can be employed for an charge injecting electrode.

Figure 2:
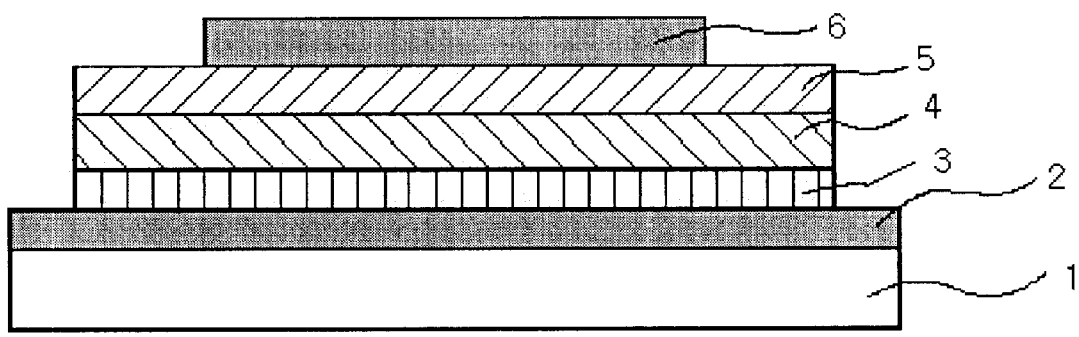
FIG. 2 is a cross-sectional view of an EL device of the present invention employing an organic EL material/clay nanocomposite.

A preferred embodiment of the EL device of the present invention employing an organic EL material/clay nanocomposite is illustrated in FIG. 2. As shown in FIG. 2, the EL device employing an organic EL material/clay nanocomposite comprises a transparent substrate (1), such as glass, a semitransparent electrode (2) deposited on the transparent substrate, a clay nanocomposite emissive layer (4) spin-coated with the organic EL material/clay nanocomposite of the invention, positioned on the semitransparent electrode, and a metal electrode (6) deposited on the clay nanocomposite emissive layer. To improve the EL efficiency, the device may be further provided with a hole transporting (or injecting) layer (3) between the semitransparent electrode (2) and the clay nanocomposite emissive layer (4) and/or an electron transporting (or injecting) layer (5) between the clay nanocomposite emissive layer (4) and the metal electrode (6), where the hole transporting layer is preferably made of one of polymers with hole-transporting moiety including poly(9-vinylcarbazole) and its derivatives; small organic materials (monomers or oligomers) including 4,4'-dicarbazolyl-1,1'-biphenyl (CBP), TPD (N,N'-diphenyl-N,N'-bis-(3-methylphenyl)-1,1'-biphenyl-4, 4'-diamine), NPB (4,4'-bis[N-(-naphthyl-1-)-N-phenyl-amino]-biphenyl), triethylamine, pyrazole, and their derivatives; or, other organic materials (monomers, oligomers, and polymers) containing hole transporting moieties. The electron transporting layer is preferably made of TPBI (2,2',2'-(1,3,5-benzenetriyl)tris[1-phebenzimidazole]), poly(phenyl quinoxaline), 1,3,5-tris[(6,7-dimethyl-3-phenyl) quinoxaline-2-yl]benzene (Me-TPQ), polyquinoline, tris(8-hydroxyquioline)aluminum (Alq3), {6-N,N-diethylamino-1-methyl-3-phenyl-1H-pyrazole[3,4-b]quinoline} (PAQ-Net2), or other organic materials (monomers, oligomers, and polymers) containing electron transporting moieties.

The luminescent efficiency of EL devices is expressed in terms of external quantum efficiency, e.g., percentage (%) of the number of externally emitted photons against the number of injected electrons. For the EL devices of the present invention, as the content of nanoclay is increased, the higher external quantum efficiency is obtained and the gas penetration is decreased, resulting in the distinctive decrease of photoluminescent decay caused by protecting the penetration of the external gases such as oxygen and moisture. Therefore, the luminescent efficiency and the stability of the EL devices are simultaneously improved as the content of nanoclay is increased.

The present invention is further illustrated by the following examples, which should not be taken to limit the scope of the invention.

EXAMPLE 1

Measurement of the Luminescent Intensity of EL Device

An emissive material, MEH-PPV (poly[2-methoxy-5-(2'-ethyl-hexyl)-p-phenylene vinylene]) was dissolved in 1,2-dichloroethane, and a nanoclay, montmorillonite (MMT) was blended with the MEH-PPV solution in the ratio of 1:1 (w/w). The resultant was sonicated to intercalate the MEH-PPV chain into MMT. And then, an EL device was prepared by spin-coating the mixture onto an ITO glass in 150 nm thickness to give a thin film, followed by thermal evaporation of an Al electrode deposited on the emissive nanocomposite layer. The EL intensity with the function of time was measured using a photodiode (Newport 818-UV) connected to optical powermeter (Newport 1830-C) after applying a short wavelength light of 340 nm.

COMPARATIVE EXAMPLE 1

Measurement of the Luminescent Intensity of EL Device Not Employing Nanoclay

An EL device was prepared in a similar manner as in Example 1, except that nanoclay was not employed. The EL intensity with the function of time was measured, and compared to the result of Example 1 (see: FIG. 3). FIG. 3 is a graph showing the time course of the effect of nanoclay on the photoluminescence, where (○) and ( ) represent the results of Example 1 and Comparative Example 1. As shown in FIG. 3, the photoluminescent intensity of the nanocomposite EL material employing nanaoclay decreased relatively slower than that of the EL material without nanaoclay, demonstrating that the luminescent stability of the nancomposite EL material employing nanaoclay was substantially improved.

EXAMPLE 2

Measurement of the External Quantum Efficiency of EL Devices

Figure 4:
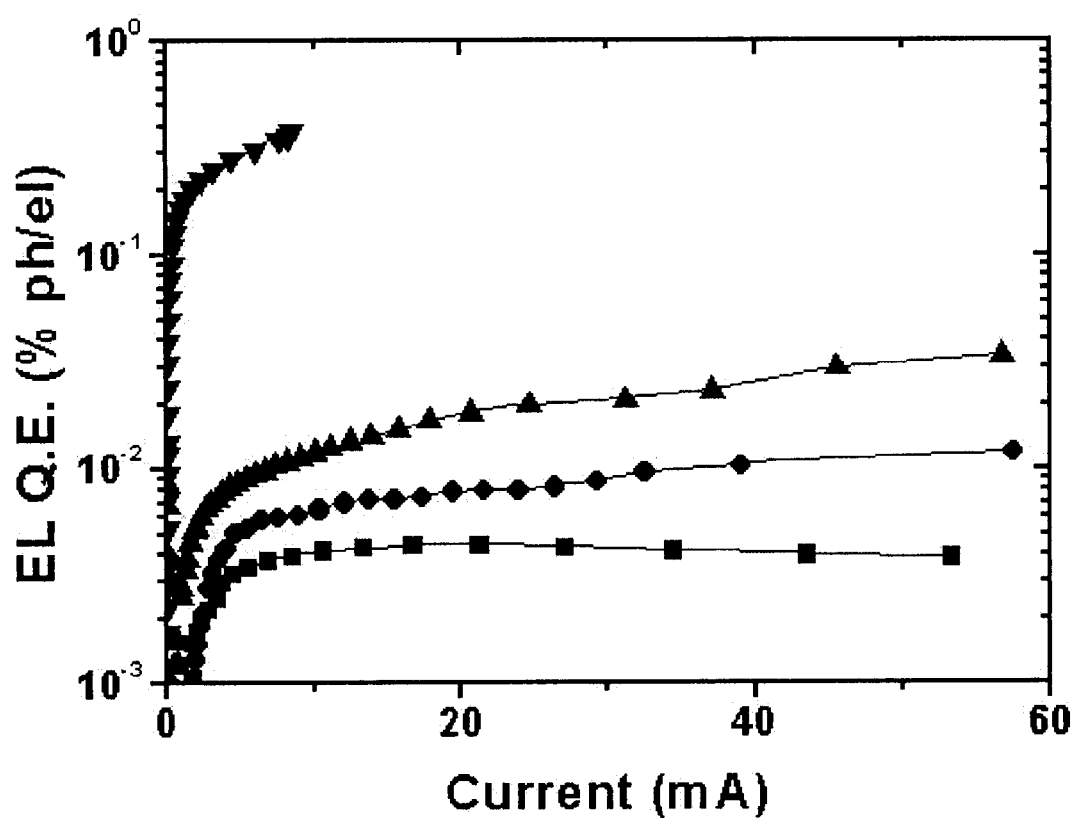
FIG. 4 is a graph showing the quantum efficiencies of EL devices with different nanoclay contents.

EL devices employing nanoclay were prepared in a similar manner as in Example 1, except that the blending ratio of MMT and MEH-PPV ranged from 1:2 to 1:5 (w/w). The external quantum efficiencies of the EL devices prepared in Example 1, Comparative Example 1, and Example 2, depending on the electric current, were measured using Keithley 236 Source measurement unit (see: FIG. 4). FIG. 4 is a graph showing the external quantum efficiencies of the EL devices, where (■) represents the change of the external quantum efficiency of an EL device not including MMT as prepared in Comparative Example 1; (●) represents an EL device in which the blending ratio of MMT and MEH-PPV is 1:5 (w/w); (▲) represents an EL device in which the blending ratio of MMT and MEH-PPV is 1:2 (w/w); and (▼) represents an EL device in which the blending ratio of MMT and MEH-PPV is 1:1 (w/w) as prepared in Example 1. As shown in FIG. 4, the external quantum efficiency of an EL device in which the blending ratio of MMT and MEH-PPV is 1:1 (w/w) showed the maximum value of 0.38% (photons/electrons), while the external quantum efficiency of the EL device not containing MMT, prepared in Comparative Example 1, showed 0.004% (photons/electrons). Therefore, it was clearly demonstrated that the external quantum efficiency was dramatically increased when the nanoclay was blended with the emissive materials.

EXAMPLE 3

Preparation of EL Device (I)

The material prepared by blending an EL material, poly (xylylidene tetrahydrothiophenium) (PTHT) and a nanoclay, MMT, in the ratio of 1:1 (w/w) was spin-coated on the ITO plate in 150 nm thickness and heated at 170° C. for 3 hours to give a clay nanocomposite emissive layer. And then, an aluminum electrode was deposited in 100 nm thickness and at a deposition rate of 5 Å/s on the resulting material by the aid of a thermal evaporator to give an EL device.

EXAMPLE 4

Preparation of EL Device (II)

An EL device was prepared in a similar manner as in Example 3, except that MEH-PPV (poly[2-methoxy-5-(2'-ethyl-hexyloxy)-p-phenylene vinylene]) was used as an EL material, and spin-coating of the material was followed to form an 120 nm-thick film, and then a calcium electrode was deposited thereon.

EXAMPLE 5

Preparation of EL Device (III)

An EL device was prepared in a similar manner as in Example 2, except that the material prepared by doping poly(9-vinylcarbazole) with alumina quinone (Alq3) in 5% weight ratio was used as an EL material, and spin-coating was followed to form 120 nm-thick film, and then a magnesium electrode was deposited.

EXAMPLE 6

Preparation of EL Device (IV)

A hole transporting material, poly(9-vinylcarbazole) (PVK) was spin-coated on ITO substrate and then a material prepared by blending an EL material, MEH-PPV and a nanoclay in the weight ratio of 1:1 was spin-coated on the top of the PVK film in 100 nm thickness. And then, an electron transporting material, alumina quinone (Alq3) was deposited in 50 nm thickness and at a deposition rate of 10

Å/s using a thermal evaporator. On the resulting material, an aluminum electrode was deposited in 100 nm thickness and at a deposition rate of 5 Å/s using the same thermal evaporator to give an EL device.

As clearly described and demonstrated as above, the present invention provides an organic EL material/clay nanocomposite with improved luminescent efficiency and stability, which is prepared by blending an organic EL material with a nanoclay, and EL devices employing the same. The EL device of the invention comprises: a transparent substrate; a semitransparent electrode deposited on the transparent substrate; a clay nanocomposite emissive layer spin-coated with an organic EL material/clay nanocomposite, positioned on the semitransparent electrode; and, a metal electrode deposited on the clay nanocomposite emissive layer. Since the electroluminescent device of the invention provides improved luminescent efficiency and stability, it can be practically applied to the development of organic semi-conductor.

Although the preferred embodiments of present invention have been disclosed for illustrative purpose, those who are skilled in the art will appreciate that various modifications, additions, and substitutions are possible, without departing from the spirit and scope of the invention as disclosed in the accompanying claims.

What is claimed is:

1. A nanocomposite comprising an organic luminescent material and a laminated inorganic material, wherein the laminated inorganic material comprises layered plates and wherein the organic luminescent material is intercalated between the layered plates, wherein a weight ratio of the laminated inorganic material to the organic luminescent material is from about 1:1 to about 1:5.

2. The nanocomposite of claim 1, wherein the laminated inorganic material has a thickness in the range of 0.2 to 2 nm in the vertical direction and a thickness in the range of 10 to 5,000 nm in the horizontal direction.

3. The nanocomposite of claim 1, wherein the laminated inorganic material is a nanoclay selected from the group consisting of montmorillonite, laponite, and kaolinite.

4. The nanocomposite of claim 1, wherein the organic luminescent material is selected from the group consisting of emissive conjugated polymer, emissive non-conjugated polymer, organic luminescent monomer or oligomer, blend of emissive conjugated polymer and emissive non-conjugated polymer, blend of emissive conjugated polymer and non-emissive polymer, and blend of emissive non-conjugated polymer and non-emissive polymer.

5. The nanocomposite of claim 4, wherein the emissive conjugated polymer is selected from the group consisting of poly(p-phenylene vinylene), polythiophene, poly(p-phenylene), polyfluorene, polyarylene, poly(arylene vinylene), polyquinoline, polypyrrole, polyaniline, and polyacetylene.

6. The nanocomposite of claim 4, wherein the emissive non-conjugated polymer comprises non-conjugated main chains and side chains substituted with emissive functional groups.

7. The nanocomposite of claim 4, wherein the organic luminescent monomer or oligomer is selected from the group consisting of metal chelate complex, rubrene, anthracene, perylene, coumarin 6, Nile red, aromatic diamine, TPD (N,N'-diphenyl-N,N'-bis-(3-methylphenyl)-1,1'-biphenyl-4,4'-diamine), TAZ (3-(4-biphenyl)-4-phenyl-(4-tert-butylphenyl)1,2,4-triazole), and DCM (dicyanomethylene)-2-methyl-6-(p-dimethylaminostyryl)-4H-pyran).

8. The nanocomposite of claim 7, wherein the metal chelate complex is alumina quinone.

9. The nanocomposite of claim 4, wherein the non-emissive polymer is poly(m-methylacrylic acid), polystyrene or poly(9-vinylcarbazole).

10. An electroluminescent device which comprises:
a transparent substrate;
a semitransparent electrode deposited on the transparent substrate;
an emissive layer comprising the nanocomposite of claim 1, positioned on the semitransparent electrode; and,
a metal electrode deposited on the emissive layer.

11. The electroluminescent device of claim 10, wherein the transparent substrate comprises a material selected from the group consisting of glass, quartz and polyethylene terephthalate.

12. The electroluminescent device of claim 10, wherein the semitransparent electrode comprises a material selected from the group consisting of lead oxide, indium tin oxide, doped polyaniline, doped polypyrrole, polyethylene dioxythiophene, and doped polythiophene.

13. The electroluminescent device of claim 10, wherein the metal electrode comprises a material selected from the group consisting of aluminum, magnesium, lithium, calcium, copper, silver, iron, platinum, indium, palladium, tungsten, zinc, gold, lead, and an alloy thereof.

14. An electroluminescent device which comprises:
a transparent substrate;
a semitransparent electrode deposited on the transparent substrate;
a hole transporting layer positioned on the semitransparent electrode;
an emissive layer comprising the nanocomposite of claim 1, positioned on the hole transporting layer; and,
a metal electrode deposited on the emissive layer.

15. The electroluminescent device of claim 14, wherein the hole transporting layer comprises an organic material containing a hole transporting moiety.

16. The electroluminescent device of claim 14, wherein the hole transporting layer comprises a material selected from the group consisting of poly(9-vinylcarbazole), 4,4'-dicarbazolyl-1,1'-biphenyl), (N,N'-diphenyl-N,N'-bis-(3-methylphenyl)-1,1'-biphenyl-4,4'-diamine), (4,4'-bis[N-(-naphthyl-1-)-N-phenyl-amino]-biphenyl), triarylamine, pyrazole, and derivatives thereof.

17. An electroluminescent device which comprises:
a transparent substrate;
a semitransparent electrode deposited on the transparent substrate;
an emissive layer comprising the nanocomposite of claim 1, positioned on the semitransparent electrode;
an electron transporting layer positioned on the emissive layer; and,
a metal electrode deposited on the electron transporting layer.

18. The electroluminescent device of claim 17, wherein the electron transporting layer comprises an organic material containing an electron transporting moiety.

19. The electroluminescent device of claim 17, wherein the electron transporting layer comprises a material selected from the group consisting of 2,2',2'-(1,3,5-phenylene-tris[1-phenyl-1H-benzimidazole], poly(phenyl quinoxaline), 1,3,5-tris[(6,7-dimethyl-3-phenyl)quinoxaline-2-yl]benzene, polyquinoline, tris(8-hydroxyquinoline)aluminum, and 6-N,N-diethylamino-1-methyl-3-phenyl-1H-phenyl-1H-pyrazolo[3,4-b]quinoline.

20. An electroluminescent device which comprises:

a transparent substrate;

a semitransparent electrode deposited on the transparent substrate;

a hole transporting layer positioned on the semitransparent electrode, wherein the hole transporting layer comprises a material selected from the group consisting of poly(9-vinylcarbazole), 4,4'-dicarbazolyl-1,1'-biphenyl, (N,N'-diphenyl-N,N'-bis-(3-methylphenyl)-1,1'-biphenyl-4,4'-diamine), (4,4'-bis[N-(-naphthyl-1)-N-phenylamino]-biphenyl), triarylamine, pyrazole, and derivatives thereof;

an emissive layer comprising the nanocomposite of claim 1, positioned on the hole transporting layer;

an electron transporting layer positioned on the emissive layer, wherein the electron transporting layer comprises a material selected from the group consisting of 2,2',2'-(1,3,5-phenylene-tris[1-phenyl-1H-benzimidazole], poly(phenyl quinoxaline), 1,3,5-tris[(6,7-dimethyl-3-phenyl)quinoxaline-2-yl]benzene, polyquinoline, tris(8-hydroxyquinoline)aluminum, and 6-N,N-diethylamino-1-methyl-3-phenyl-1H-pyrazolo[3,4-b]quinoline; and, a metal electrode deposited on the electron transporting layer.

21. The nanocomposite of claim 1, wherein the organic luminescent material comprises MEH-PPV.

22. The nanocomposite of claim 1, wherein a weight ratio of the laminated inorganic material to the organic luminescent material is from about 1:1 to about 1:2.

23. The nanocomposite of claim 1, wherein a weight ratio of the laminated inorganic to the organic luminescent material is from about 1:2 to about 1:5.

24. A method of preparing the nanocomposite of claim 1, comprising:

providing the organic luminescent material;

providing the laminated inorganic material;

mixing the organic luminescent material and the laminated inorganic material in a liquid; and intercalating the organic luminescent material between the layered plates of the inorganic material.

25. The method of claim 24, wherein the intercalation is carried out by sonicating the mixture.

* * * * *

UNITED STATES PATENT AND TRADEMARK OFFICE
CERTIFICATE OF CORRECTION

PATENT NO. : 6,593,688 B2
DATED : July 15, 2003
INVENTOR(S) : Park et al.

It is certified that error appears in the above-identified patent and that said Letters Patent is hereby corrected as shown below:

Column 10,
Line 9, after "inorganic", please insert -- material --.

Signed and Sealed this

Twenty-ninth Day of June, 2004

JON W. DUDAS
*Acting Director of the United States Patent and Trademark Office*